(12) United States Patent
Yonemura

(10) Patent No.: US 6,843,609 B2
(45) Date of Patent: Jan. 18, 2005

(54) OPTICAL MODULE WITH LENS HOLDING MEMBER

(75) Inventor: Ryugen Yonemura, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 188 days.

(21) Appl. No.: 10/084,670

(22) Filed: Feb. 28, 2002

(65) Prior Publication Data

US 2002/0149861 A1 Oct. 17, 2002

(30) Foreign Application Priority Data

Feb. 28, 2001 (JP) ........................................ 2001-055342

(51) Int. Cl.$^7$ .............................. G02B 6/42; G02B 7/02
(52) U.S. Cl. ............................ 385/93; 385/92; 359/819
(58) Field of Search ............................... 385/88, 92–94; 359/811, 819

(56) References Cited

U.S. PATENT DOCUMENTS

| 5,073,047 A | 12/1991 | Suzuki et al. | |
|---|---|---|---|
| 5,119,462 A | * 6/1992 | Matsubara et al. | ............ 385/93 |
| 6,061,493 A | * 5/2000 | Gilliland et al. | ............... 385/93 |
| 6,409,398 B2 | 6/2002 | Nakaya et al. | |
| 2002/0164131 A1 | 11/2002 | Yoshimura et al. | |

* cited by examiner

Primary Examiner—Akm Enayet Ullah
Assistant Examiner—Omar Rojas
(74) Attorney, Agent, or Firm—McDermott Will & Emery LLP

(57) ABSTRACT

An optical module 10 comprises a mounting member 20, a lens holding member 30, a lens 32 and an optical semiconductor element 22. The mounting member 20 and the lens holding member 30 are arranged along a predetermined axis 12. The optical semiconductor element 22 is optically coupled to the lens 32. The wall portion of the lens holding member 30 comprises a first inner surface 30g and a second inner surface 30f. The first inner surface 30g is located outside a reference surface extending in a direction of the predetermined axis and intersecting with a supporting portion to form a predetermined closed line, and the second inner surface 30f is located inside the reference surface.

13 Claims, 17 Drawing Sheets

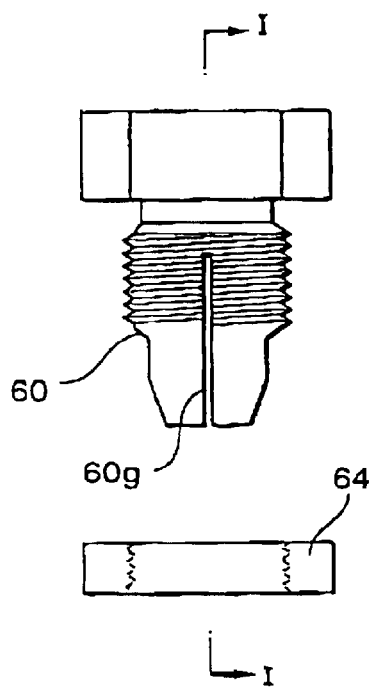
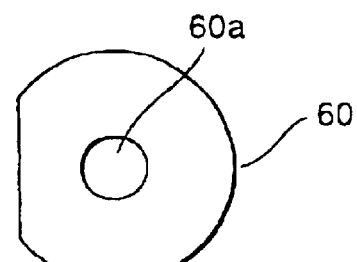
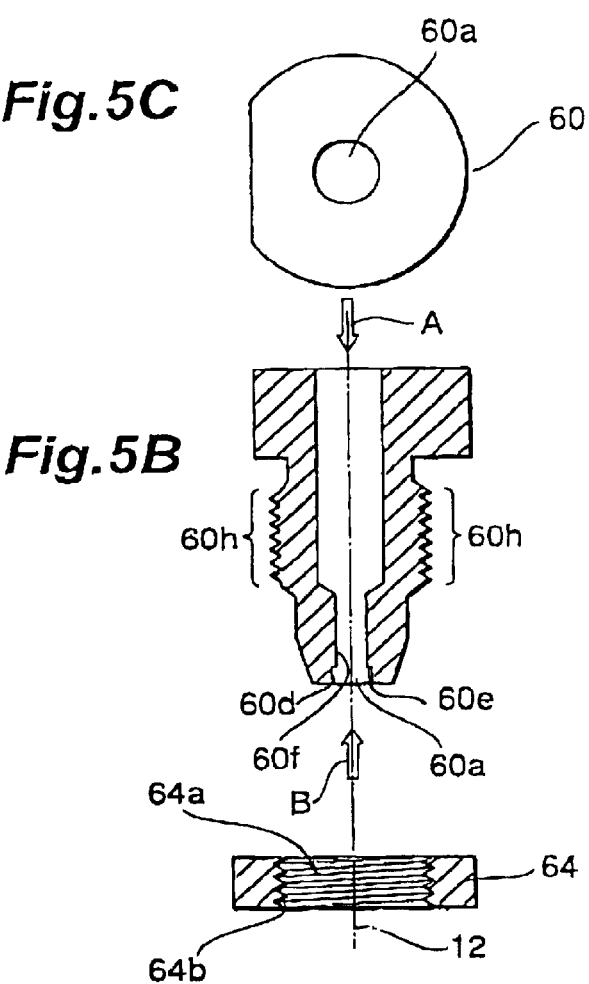
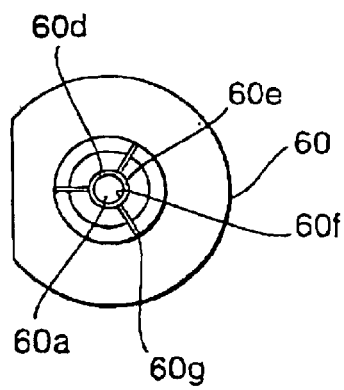

OPTICAL MODULE WITH LENS HOLDING MEMBER

BACKGROUND OF THE INVENTION

1. Field of the Invention

The present invention relates to an optical module.

2. Description of the Related Art

There are many different forms of optical module, and one of these is an optical module provided with a metal stem, a cap, a sleeve, and a photodiode which is sealed by means of the stem and cap. In this optical module, the metallic stem mounts the photodiode thereon. This photodiode is sealed by the stem and cup which are welded to each other. The stem has terminals connected to the photodiode, and these terminals are electrically isolated from the stem by sealing glass members. These glass members provide hermetic sealing between the terminals and the stem. The sleeve is disposed outside the cap and is welded to the outer edge of the stem.

SUMMARY OF THE INVENTION

The present inventor has discovered that there is a demand for reducing the outer diameter of a cap in optical modules of this kind. The inventor has studied structures allowing the reduction of the cap. However, in inspecting a prototype of an optical module, the inventor has found that some defective products in which the hermetic sealing of their packages was insufficient. These defective products are of frequent occurrence. By conducting further investigation, the inventor has discovered that the defective products had insufficient glass hermetic sealing between the terminals and the stem to cause leakage thereat.

Techniques used in the manufacturing process of the optical modules have been used to produce similar types of optical modules. The inventor has made investigation in detail which of the manufacturing steps caused the leakage, and found that the insufficient hermetic sealing comes from the process of welding the cap to the stem.

Therefore, it is an object of the present invention to provide a small-sized optical module having a structure capable of reducing the occurrence of sealing defects in the housing thereof.

One aspect of the present invention relates to an optical module. The optical module comprises a mounting member and a lens holding member. The mounting member has a mounting portion, a supporting face, and a terminal electrically connected to a optical semiconductor element. The mounting portion is provided to mount the optical semiconductor element thereon. The terminal are provided in the mounting portion. The supporting face is provided to surround the mounting portion.

The lens holding member comprises one end portion, another end portion, a side wall portion and a holding portion. The side wall portion and holding portion are arranged between the one end portion and the other end portion in a direction of a predetermined axis. The lens holding member is provided on the supporting face of the mounting member to cover the optical semiconductor element.

The holding portion of the lens holding member holds a lens optically coupled to the optical semiconductor element. The side wall portion comprises first and second inner surfaces. The first inner surface extends from the one end portion in a direction of the predetermined axis. The second inner surface extends from the holding portion in a direction of the predetermined axis. The first inner surface is provided outside a reference surface, and the second inner surface is provided inside the reference surface. The reference surface extends in a direction the predetermined axis and intersects the supporting face to form a closed loop surrounding the mounting portion.

Another aspect of the present invention relates to an electrode component for a seam sealer device. The electronic component for a seam sealer apparatus is used to weld the lens holding member to the mounting member of the optical module. The lens holding member has a side wall portion and a lens holding portion, and these portions are arranged in a direction of a predetermined axis.

The electrode component for the seam sealer apparatus comprises an accommodating portion and a holding portion. The accommodating portion and the holding portion are arranged in a direction of a predetermined axis and are provided to accommodate the lens holding member. The holding portion has a first inner surface, and the first inner surface extends in the axial direction so as to face the side wall portion of the lens holding member. The accommodating portion extends in the axial direction, and is capable to hold the lens holding member. When the electrode for the seam sealer apparatus receives a lens holding member therein, the first inner surface of the electrode component is faced to the side wall portion of the lens holding portion.

In the electrode component according to the present invention, the accommodating portion is divided to form a plurality of slits each extending in the axial direction. Moreover, the electrode component may also comprise a pressure application portion provided between the holding portion and the accommodating portion. The pressure application portion has a third inner surface extending along a plane intersecting with the predetermined axis. The third inner surface is provided such that the third inner surface can apply pressure to the lens holding member. Furthermore, the electrode component may further comprise an insulating material provided on the third inner surface of the pressure application portion.

Still another aspect of the present invention relates to a method of manufacturing an optical module. This method comprises the steps of: (1) placing the mounting member and the lens holding member in between a first and second electrode components of a seam sealer apparatus; and (2) applying pressure to a mounting member and a lens holding member, and passing current through the mounting member and the lens holding member between the first electrode component and the second electrode component.

BRIEF DESCRIPTION OF THE DRAWINGS

FIG. 5A is a side view showing an upper electrode for a seam sealer apparatus; and FIG. 5B is a cross sectional view showing an upper electrode for the seam sealer apparatus; FIG. 5C is a rear view showing an upper electrode for the seam sealer apparatus; and FIG. 5D is a front view showing an upper electrode for the seam sealer apparatus;

Figure 1:
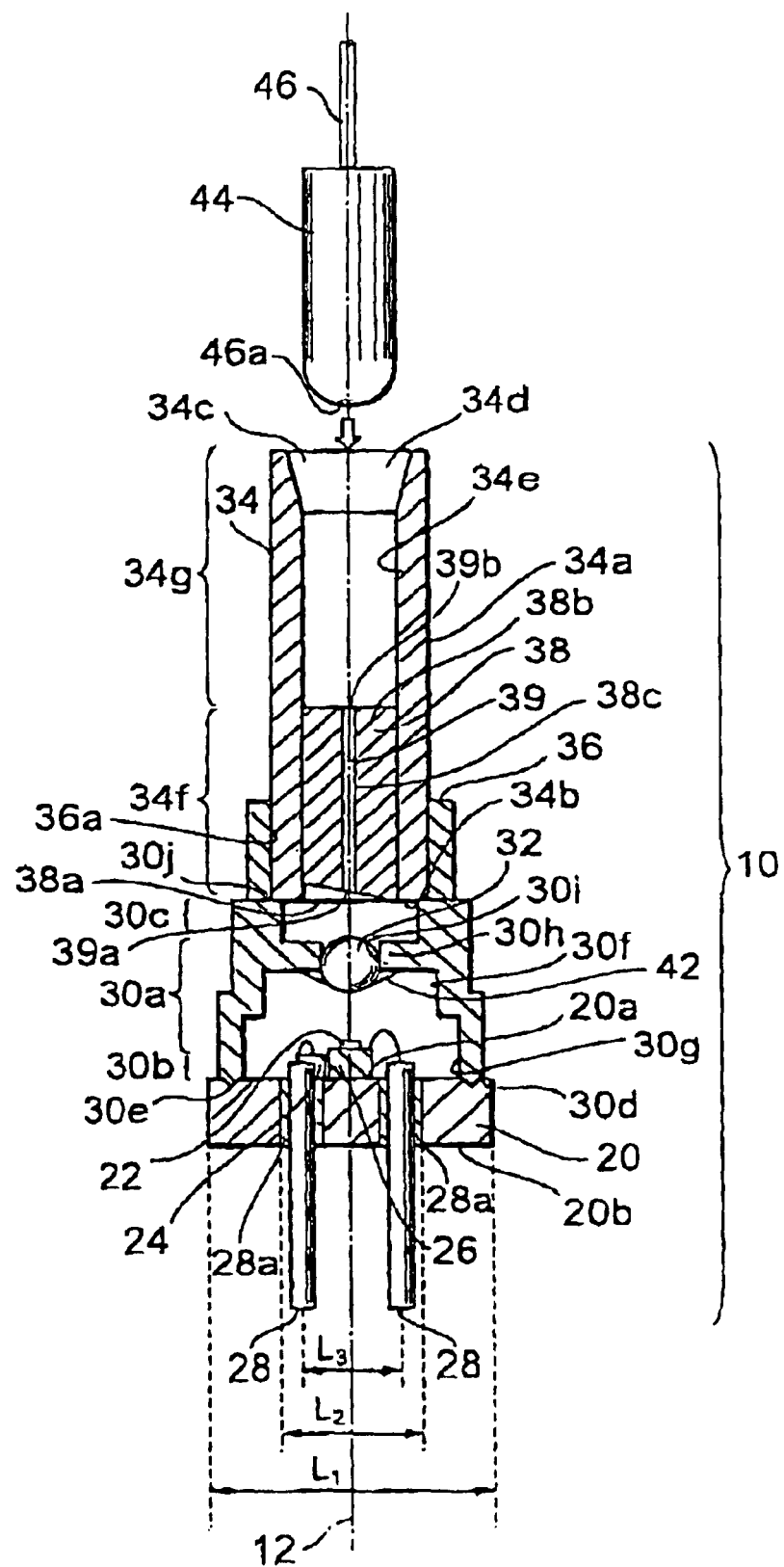
FIG. 1 is a cross sectional view of an optical module according to an embodiment.

The aforementioned objects and other objects of the present invention, and the features and advantages thereof, will become more readily apparent from the following description of preferred embodiments of the present invention with reference to the accompanying drawings shown as examples thereof.

DESCRIPTION OF THE PREFERRED EMBODIMENTS

Embodiments of the present invention are now described with reference to the accompanying drawings. Identical parts are referred to with the same reference symbols, if possible.

(First embodiment)

An optical module 10 according to an embodiment of the present invention is now described with reference to FIG. 1. The optical module 10 comprises a mounting member 20, such as a stem, an optical semiconductor element 22, a lens holding member 30 such as a cap, a sleeve guide 36, and a wave guide member 39. The optical module 10a may further comprises light condensing means, such as a lens 32, provided between the optical semiconductor element 22 and the wave guide 39. Moreover, the optical module 10a may be provided with a sleeve 34 and a ferrule 38, and the ferrule 38 is inserted into the sleeve 34. The sleeve 34 and ferrule 38 can be accommodated in the sleeve guide 36, and the wave guide member 39 includes an optical fiber held by the ferrule 38.

In the optical module 10, the following are provided along an axis 12 extending in a predetermined direction. A mounting member 20, an optical semiconductor element 22; a lens holding member 30, a lens 32, a sleeve 34, a sleeve holder 36, a ferrule 38, and a wave guide member 39. The optical axis of the optical semiconductor element 22 can be adjusted to the predetermined axis 12. The subsequent description relates to an optical module including an optical fiber used as a wave guide member 39. The optical fiber, working as an optical wave guide, has a core portion and a cladding portion provided around the core portion. The side of the optical fiber is coated with resin, and the optical fiber is inserted into the ferrule as shown in FIG. 1.

The mounting member 20 may be a plate-shaped member extending in a plane intersecting with the predetermined axis 12, and is, for example, a metallic member formed by metal-plating an iron plate. One example of the mounting member 2 is a stem. The mounting member 20 comprises a component mounting face 20a and a terminal installation face 20b both extending in a planar fashion. A component mounting member 26, such as a chip carrier, is disposed on the component mounting face 20a. The component mounting member 26 has a mounting face (reference numeral 26a in FIG. 2) for mounting the optical semiconductor element 22. The optical semiconductor element 22, such as a semiconductor light-receiving element or a semiconductor light-emitting element, is disposed on the mounting face. The semiconductor light-receiving element may be a photodiode, and the semiconductor light-emitting element may be a light-emitting diode or a semiconductor laser.

The optical module 10a, shown in FIG. 1, comprises a photodiode having light receiving surface. In this case, the light receiving surface of the light receiving semiconductor element intersects at a predetermined angle, for example, perpendicularly, with the predetermined axis 12. FIG. 1 shows an exemplary view of an optical module 10a employing a semiconductor light-receiving element, such as a photodiode, but the optical module 10a may contain a semiconductor light-emitting element, such as a semiconductor laser, in place of the semiconductor light-receiving element.

The lens holding member 30 comprises a tubular portion 30a, a first end portion 30b, and a second end portion 30c. The tubular portion 30a extends in a direction of the predetermined axis 12. The first end portion 30b is provided at one end of the tubular portion 30a. The second end portion 30c is provided at the other end of the tubular portion 30a. The lens holding member 30 is made of metal, such as stainless steel. The first end portion 30b comprises a securing face 30d capable of contacting the mounting member 20. A loop-shaped projection 30e is provided on the securing face 30d to surround the axis 12. The lens holding member 30 is secured to the mounting member 20 such that the securing face 30d is faced to the mounting face (reference numeral 20e in FIG. 2) of the mounting member 20. This securing may be carried out in the following way, for example: The lens holding member 30 is disposed on the mounting member 20 such that the loop-shaped projection 30e contacts the component mounting face 20a.

The tubular portion 30a has a side wall portion extending in the predetermined axial direction 12, and this side wall portion comprises a first inner face 30g and a second inner face 30f. The first inner face 30g extends from the first end portion 30b. A ring-shaped extending portion (extension) 30h is provided on the second inner face 30f to form a lens installation hole. A lens 32 can be disposed in the ring-shaped extending portion (extension) 30h. The lens installation hole is defined by a holding face 30i provided so as to surround the axis 12. The lens 32 can be positioned by means of this lens installation hole. The lens 32 in the lens installation hole is secured to the lens holding member 30 in a bonding member 42, such as low melting point glass. The secured lens 32 is faced to the optical semiconductor element 22. The bonding member 42 is provided in a ring shape so as to bond the lens 32 and the holding face 30i with each other, thereby ensuring the sealing of the bond portion. The second end portion 30c comprises an end face 30j for supporting the sleeve holder 36.

When the lens holding member 30 is secured onto the mounting member 20, a region for accommodating the optical semiconductor element 22 is defined by the component mounting face 20a, the inner faces 30f and 30g, the extending portion 30h, the lens 32, and the optical semiconductor element 22. The mounting member 20 and the lens holding member 30 serve as housing or accommodating members, and the closed-curve projection 30e and the bonding member 42 ensure the sealing of the accommodation space. The optical module is provided with a structure allowing the reduction of its size without using a TO-type CAN case.

One or more terminal electrodes 28, in the present embodiment, four terminal electrodes, extending in the predetermined axial direction are provided on the terminal installation face 20b of the mounting member 20. Each of the terminal electrodes 28 extends in a direction of the predetermined axis 12, and is inserted into a hole passing through the mounting member 20 from the component mounting face 20a to the terminal installation face 20b. The connecting portions between the mounting member 20 and the terminal electrodes 28 are hermetically sealed by filling the hole with glass members 28a. Each of the terminal electrodes 28 has an external terminal portion projecting from the terminal installation face 20b, and an inner terminal portion projecting from the component mounting face 20a.

The lens holding member 30 comprises a first inner face 30g and a second inner face 30f. By providing the lens holding member 30 with these faces 30f and 30g, the interval between the first inner face 30g and the terminal electrodes 28 can be made greater than the interval between the second inner face 30f and the terminal electrodes 28. This structure of the lens holding member 30 can reduce the force that is applied to the glass members 28a when the lens holding member 30 is secured to the mounting member 20, thereby obtaining the sealing of the glass members.

The sleeve holder 36 is made of metal, such as stainless steel, and is a tubular member extending in the direction of the predetermined axis 12. The sleeve holder 36 has an inner side face 36a capable of holding the sleeve 34. One end portion of the sleeve holder 36 is provided with an opening for introducing the sleeve 34. The other end portion thereof is positioned on the end face 30j of the second end portion 30c of the lens holding member 30.

The sleeve 34 is a metallic member made of stainless steel, and has a tubular portion 34a extending in the direction of the predetermined axis 12. One end portion 34c of the tubular portion 34a is provided with an opening for introducing the ferrule 38. The end portion 34c is provided with a tapered face 34d to facilitate the introduction of the ferrule 38. The other end portion 34b comprises an opening through which light is transmitted to the optical semiconductor element 22. The sleeve 34 has an inner face 34e extending in the direction of the axis 12. The inner face 34e defines a region for accommodating the ferrule 38, and is capable of a guiding the ferrule 38.

The sleeve 34 is positioned on the second end face 30j of the lens holding member 30. The sleeve 34 is aligned in position with the lens holding member 30 such that the optical semiconductor element can receive light from the optical fiber 39. The sleeve 34 is secured to the sleeve holder 36 at one end portion thereof. This securing is carried out, for example, by forming a plurality of securing portions, for example, by simultaneous laser welding using a YAG laser. If these securing portions are arranged in a high symmetrical fashion, then the distortion the securing may cause can be reduced. This high symmetrical arrangement can provide close optical coupling between the optical fiber 39 and the optical semiconductor element 22.

The ferrule 38 is accommodated in the sleeve 36. The securing of the ferrule 38 to the sleeve 36 is carried out, for example, by welding. The ferrule 38 is positioned with respect to the sleeve 34, and this positioning can stabilize the optical coupling between the lens 32 and the end 39a of the wave guide member 39, such as an optical fiber. The installation position of the ferrule 3B is determined in accordance with the focal distance of the lens 32.

The ferrule 38 comprises a first end face 38a, a second end face 38b, and a hole 38c extending from the first end face 38a to the second end face 38b in a direction of the axis 12. An optical fiber is processed by stripping off the resin therearound, and then is inserted into the hole 38c. It is preferable to polish the first end face 38a and the second end face 38b after the optical fiber has been inserted into the hold 38c. This polishing ensures that the end portions of the optical fiber 39 appear at the respective end faces 38a and 38b.

The first end face 38b can be polished to form a first angle, for example, approximately a right angle, with respect to a plane perpendicular to the axis 12. This polishing provides the close optical coupling between the end portion of the optical fiber and the optical fiber 46. The second end face 38a is inclined to a first angle of a degrees beyond an angle of 0 degree, for example, approximately 6 degrees, with respect to a plane perpendicular to the axis 12. The end face 38a can reduce the reflection of light at the end of the ferrule 44. The inclined end face 38a of this kind prevents light reflected by the optical module from returning to the end face 38a.

The tubular portion 34a of the sleeve 34 comprises a first portion 34f and a second portion 34g, and these portions are arranged adjacent to each other in a direction of the axis 12. The first portion 34f accommodates the ferrule 38. The second portion 34g is provided such that another ferrule 44 can be inserted therein. The other ferrule holds another optical fiber 46 which is to be optically coupled with the optical fiber 39.

Figure 2:
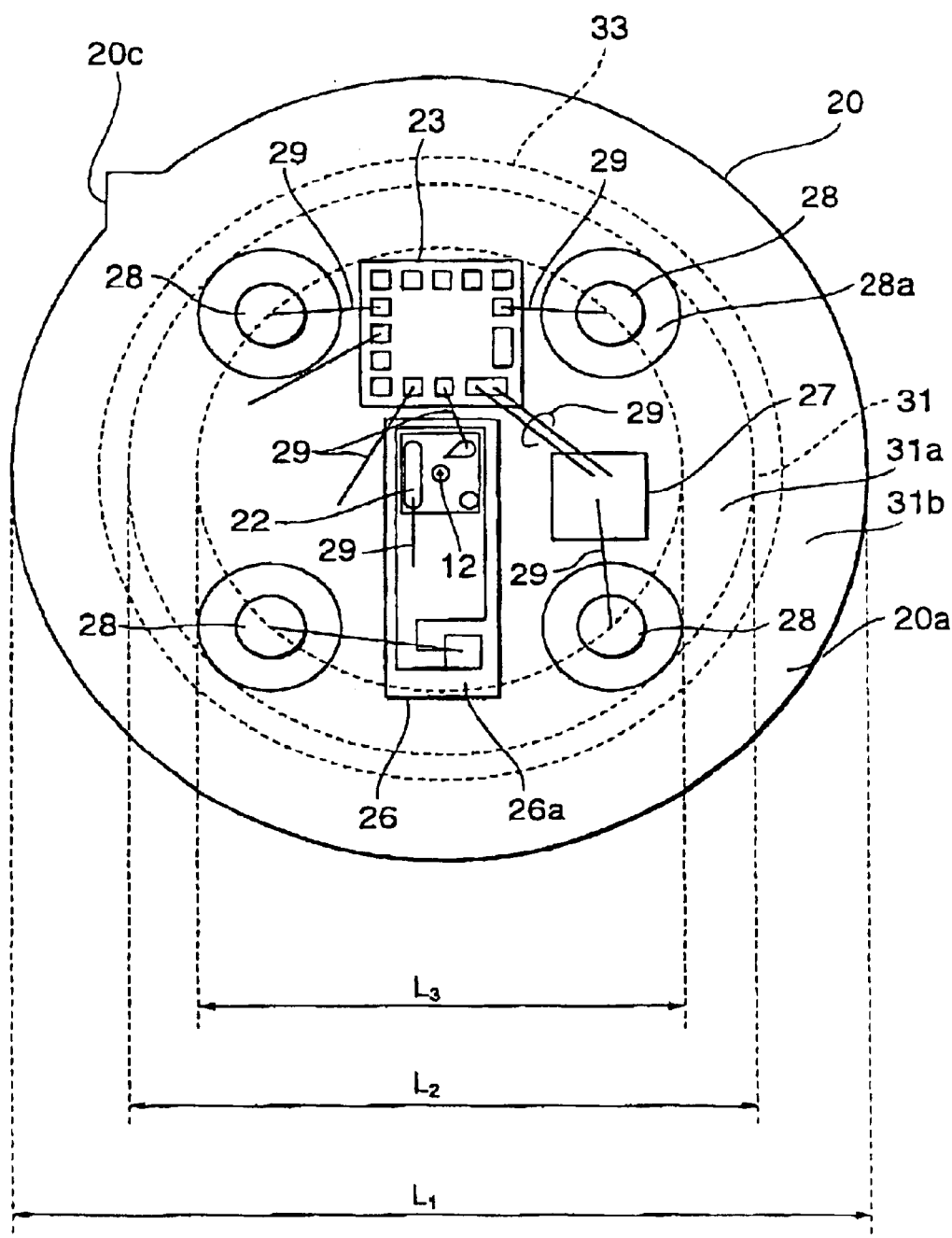
FIG. 2 is a view showing a component mounting face of a mounting member in the optical module.

FIG. 2 shows the component mounting face 20a of the mounting member 20. Referring to FIG. 2, the component mounting face 20a mounts an electronic semiconductor element 23, such as a preamplifier, and the optical semiconductor element 22. The optical semiconductor element 22 is mounted on an insulating mounting component 26, such as a die cap or submount. The mounting component 26 is mounted on the component mounting face 20a.

The optical semiconductor element 22 has a pair of electrodes, one of which is electrically connected to one of the terminal electrodes 28, for example, a Vpd terminal electrode, through a bonding wire 29 and an electrode on the mounting component 26. The other electrode of the optical semiconductor element 22 is electrically connected to the electronic semiconductor element 23 through a bonding wire 29. If the optical semiconductor element 22 is a photodiode, then the semiconductor element 23 processes an electrical signal from the diode, and supplies the processed electrical signal to a pair of terminal electrodes 28, for example, OUT and OUTB terminal electrodes. The electronic semiconductor element 23 is electrically connected to the mounting member 20 by means of the bonding wire 29, and is also connected to a ground line through the mounting member 20. The electronic semiconductor element 23 is also electrically connected to a terminal electrode 28, for instance, a Vcc terminal electrode, through the die cap 27 and bonding wire 29.

The component mounting face 20a is divided into a mounting region 31a and a supporting region 31b by a boundary line 31. The mounting region 31a mounts electronic components, such as the optical semiconductor element 22 and the electronic semiconductor element 23, and, in the embodiment shown in FIG. 2, this region is indicated by a diameter $L_2$ of 3.29 mm. The terminal electrodes are arranged on the circumference of a circle of a diameter $L_3$=2.54 mm. The sealing glass members 28a are located inside the region of diameter $L_2$. The mounting member 20 has an outer circumference indicated by diameter $L_1$=4.5 mm, and positioning projection 20c on this outer circumference. The support region 31b is provided so as to surround the mounting region 31a. The mounting member 20 is secured to the supporting region 31b.

Figure 3:
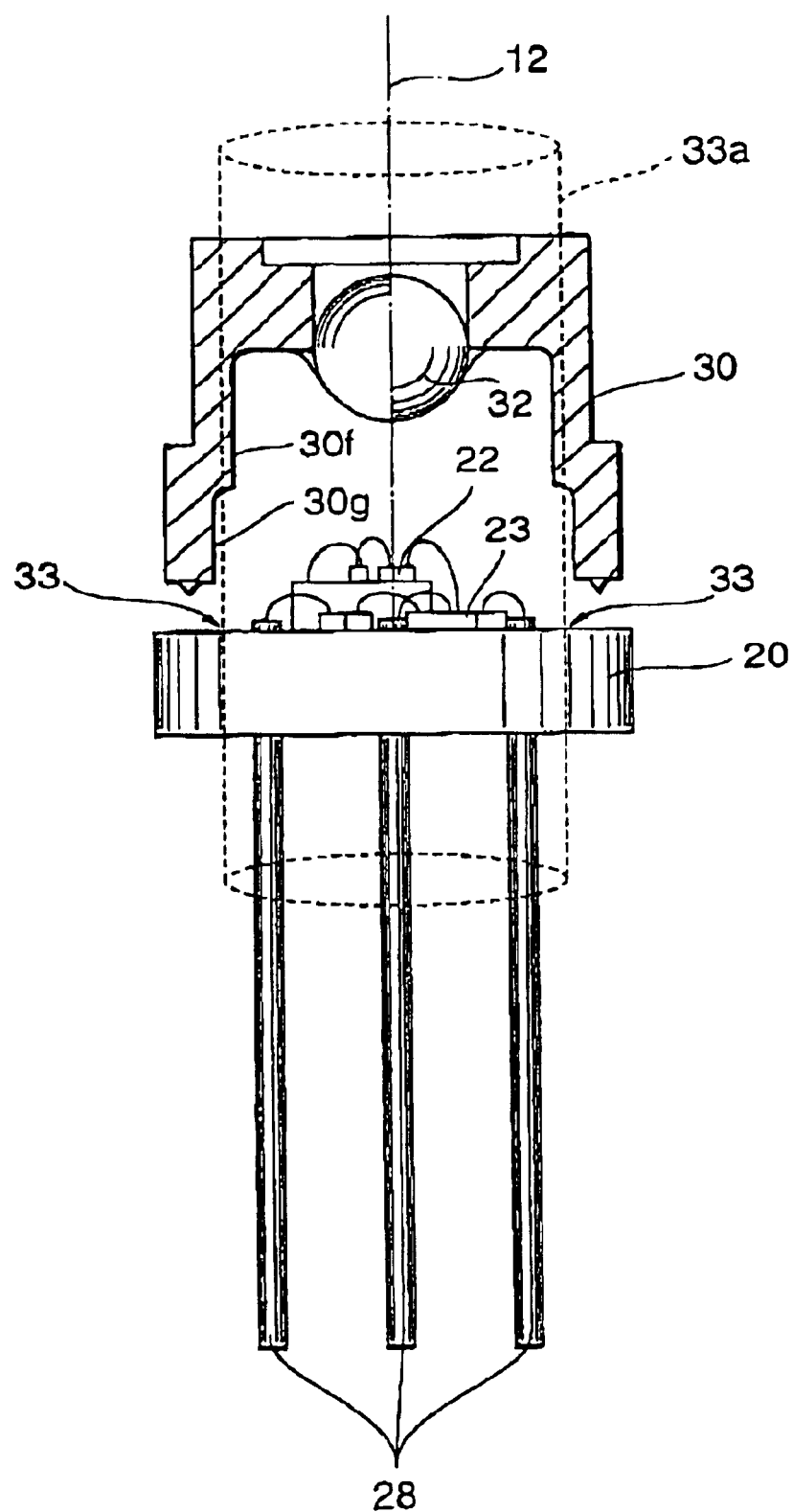
FIG. 3 is a view showing a positional relationship among a first inner surface, a second inner surface, and a reference plane.

FIG. 2 illustrates a closed curved line 33, provided so as to surround the mounting region 31a, in the support region 31b. FIG. 3 depicts a hypothetical reference surface 33a extending in the direction of the predetermined axis. This closed curved line 33 is positioned on the reference surface 33a. The lens holding member 30 is provided on the mounting member 20 such that the first inner face 30g is positioned outside the reference surface 33a and the second inner face 30f is positioned inside the reference surface 33a. According to this positioning, an optical module 10 is provided with a structure allowing the securing of the lens holding member 30 and the mounting member 20 to each other without weakening the hermetic sealing provided by the glass sealing members 28a.

(Second embodiment)

Figure 4:
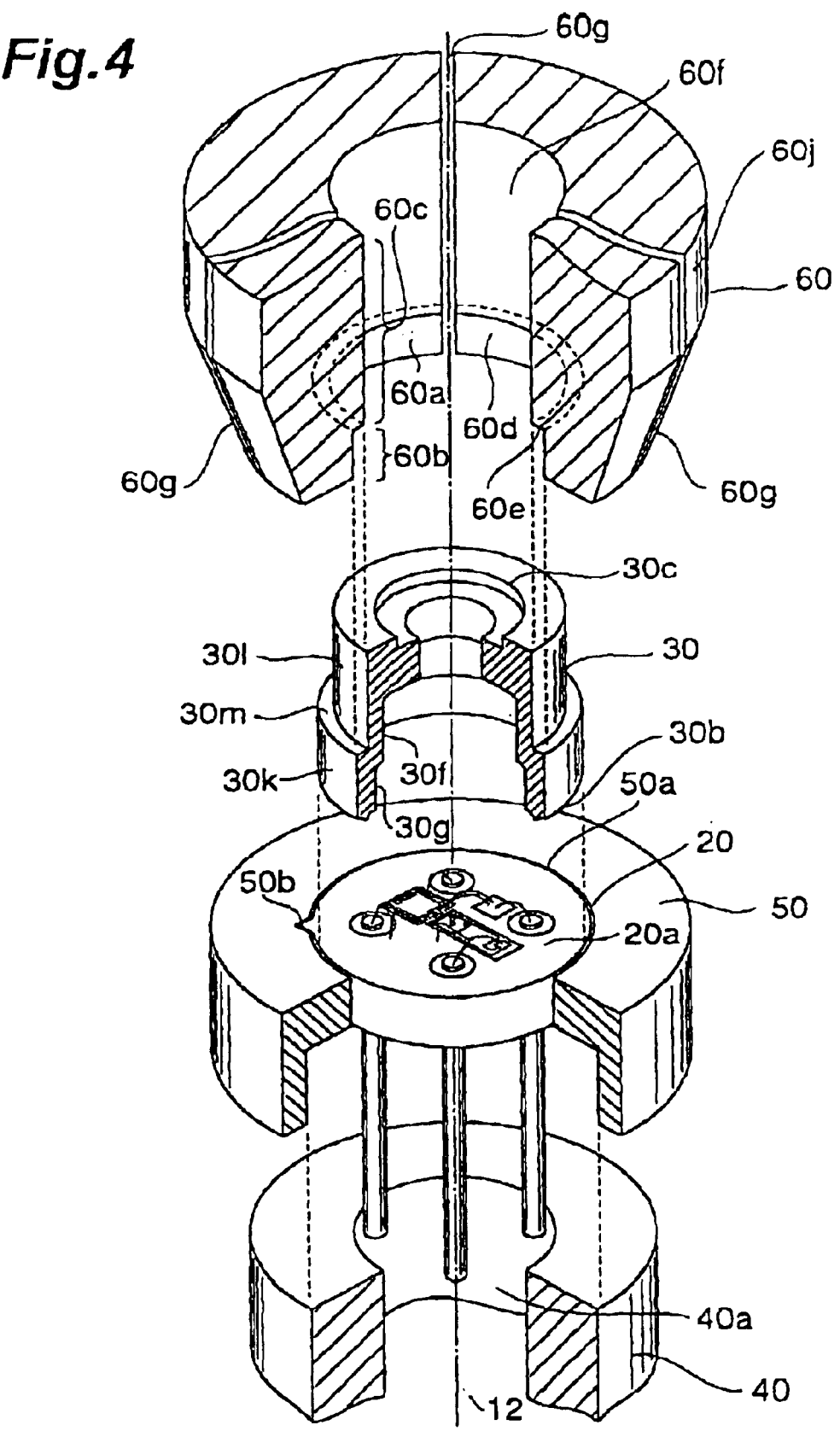
FIG. 4 is a view showing the assembling of an optical module using an upper electrode and a lower electrode provided in a seam sealer apparatus.

FIG. 4 illustrates the arrangement of mounting member 20 and lens holding member 30 in a seam sealer apparatus used for assembling an optical module 10a. The seam sealer apparatus comprises a lower electrode 40, an upper electrode 60, and an insulating stem guide 50

Referring to FIG. 4, the lower electrode 40 comprise an accommodating hole 40a for accommodating the terminal electrodes 28 provided in a direction of the axis 12. The stem guide 50 comprises an accommodating hole 50a for accommodating the mounting member 20, and a positioning depression portion 50b provided in the inner surface of the accommodating hole 50a. The position depression portion 50b is provided to receive the positioning projection 20c of the mounting member 20 therein. The insulating stem guide 50 prevents the occurrence of electrical shorting due to accidental contact between the upper electrode 60 and the lower electrode 40.

Referring to FIGS. 4 and 5A to 5D, the upper electrode 60 is now described. FIG. 5A shows a side view showing the upper electrode 60, and FIG. 5B is cross sectional view taken along I—I line in FIG. 5A. FIG. 5C is an external view showing the upper electrode 60 as viewed from the direction of arrow A in FIG. 5S, and FIG. 5D shows an external view showing the upper electrode 60 as viewed from the direction of arrow B in FIG. 5B.

Referring to FIG. 4, the upper electrode 60 comprises an accommodating hole 60a for accommodating the lens holding member 30. This accommodating hole 60a has a first portion 60b and a second portion 60c. The first portion 60b has a first inner face 60d, which is faced to a first outer face 30k of the lens holding member 30. This facing allows the first inner face 60b to reduce the deformation of the lens holding member 30. The second portion 60c has a second inner face 60f, which is faced to a second outer face 301 of the lens holding member 30. The second inner face 60f holds the lens holding member 30. The upper electrode 60 has a third inner face 60e connecting the first inner face 60b and the second inner face 60f with each other, and this third inner face 60e is faced to a third outer face 30m of the lens holding member 30. The first inner face 60d and the second inner face 60f extend in a direction of the predetermined axis 12, and the third inner face 60f extends in a plane which intersects with the predetermined axis 12. The third inner face 60e is available to apply force to the lens holding member 30 through the third outer face 30m.

The upper electrode 60 is provided with a plurality of slits 60g each extending in a direction of the predetermined axis 12. The slits 60g reach from the outer face 60j of the upper electrode 60 to the inner faces 60d to 60f thereof. In the embodiment of FIG. 4, the upper electrode 60 is provided with three slits. The three slits separate the front end portion of the upper electrode 60 into three pieces. The three slits facilitate the positioning of the lens holding member 60.

As shown in FIGS. 5A and 5B, a screw thread 60h is provided on the side of the upper electrode 60 in which the slits 60g are provided. A nut 64 has a hole 64a, extending in a direction of the axis 12, provided for receiving an upper electrode 60 therein. On the inner face of this hole, a screw thread 64b corresponding to the screw thread 60h is provided A nut 60 screws onto the screw thread 60h. The upper electrode 60 and the nut 64 are used to vary the size of the hole 60a in the front end portion of the upper electrode 60 depending on the position of the nut 64 screwed onto the upper electrode 60. This variation is achieved, for example, by providing the front end portion of the upper electrode 60 with a slightly tapered outer face.

To position the lens holding member (30 in FIG. 1) to the electrode, the lens holding member is placed in the hole 60a, and then the nut 64 is tightened to secure the lens holding member to the electrode. After the welding, the nut 64 is loosened and then the lens holding member can be detached from the electrode. In other words, the attachment and detachment of the lens holding member 30 is performed by varying the size of the hole.

Figure 6:
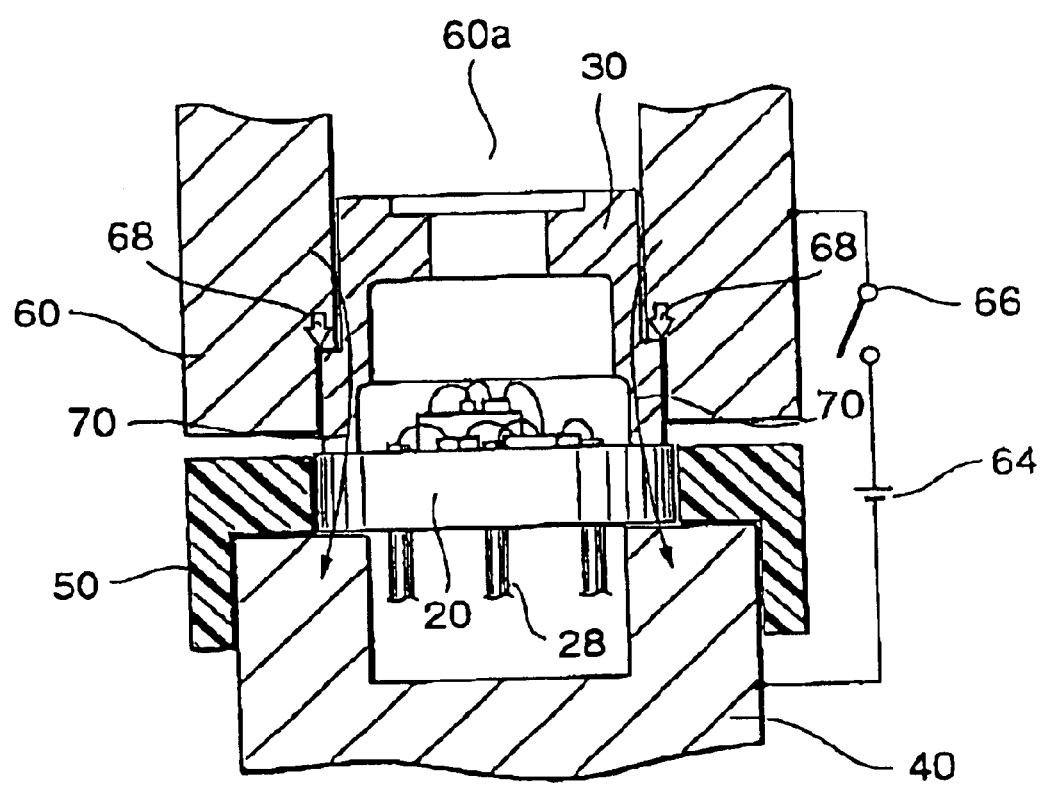
FIG. 6 illustrates the welding of a lens holding member to a mounting member by use of a seam sealer apparatus.

Referring to FIG. 6, a process of assembling the optical module 10 is now described. The stem guide 50 is positioned on the lower electrode 40. The mounting member 20 is positioned in the accommodating hole 50a of the stem guide 50. The terminal installation face 20b of the mounting member 20 is made to face the lower electrode 40. Electronic components, such as the 20 optical semiconductor element 22 and an electronic semiconductor element 23, have already been assembled on the component mounting face 20a of the mounting member 20.

With the nut 62 loosened on the upper electrode 60, the end portion 30c of the lens holding member 30 is inserted into the accommodating hole 60a. By tightening the nut 62, the lens holding member 30 can be secured to the upper electrode 60. The slits 60g and screw 62 make it possible to perform the rapid attachment and detachment of the lens holding member 30.

After these steps, the mounting member 20 has been positioned on the lower electrode 40 and the lens holding member 30 has been attached to the upper electrode 60. The lower electrode 40 and upper electrode 60 are previously positioned to the seam sealer apparatus, so that the mounting member 20 and the lens holding member 30 have been positioned Thereafter, the lens holding member 30 is placed on the mounting member 20, and then pressure 6B is applied between the upper electrode 60 and the lower electrode 40. FIG. 6 shows the mounting member 20 and the lens holding member 30 provided thereon. A power source 64 and switch 66 are connected between the upper electrode 60 and the lower electrode 40. When the switch 66 is closed, 4 current 70 exceeding a predetermined value flows between the mounting member 20 and the lens holding member 30. This current passes through the loop-shaped projection 30e and generates joule heat thereat to increase the temperature of this region. The temperature exceeds the melting point to melt the projection 30e, so that the mounting member 20 is secured to the lens holding member 30 by welding. The welded portion is continuous, thereby ensuring the hermetic sealing of the welded connecting portion and electrically connecting the mounting member 20 to the lens holding member 30. The lens holding member 30 (and the metallic sleeve 34) is connected to ground via the mounting member 20.

Figure 7A:
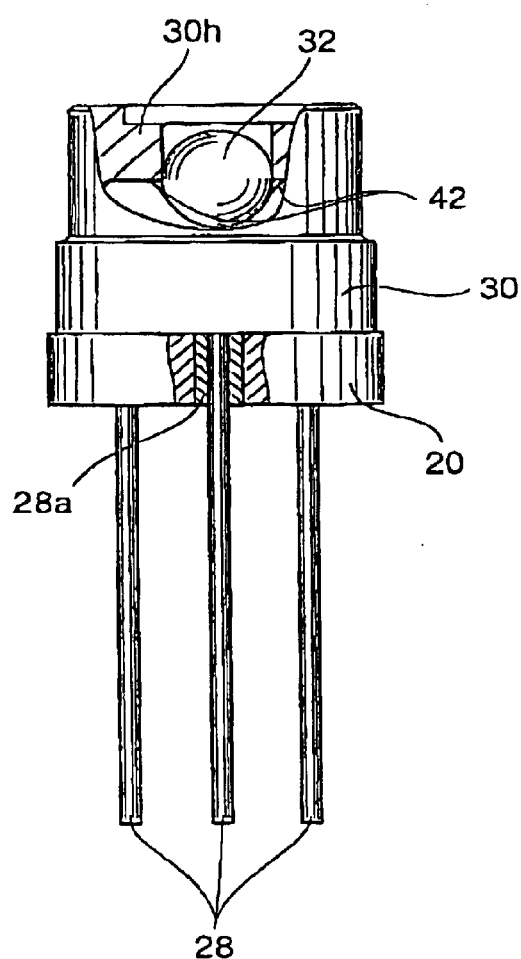
FIG. 7A is a view showing an optical module being worked on in manufacture.

By means of these steps, the lens holding member 30 is secured to the mounting member 20 by welding. Then, the lens 32 is secured to the lens holding member 30. FIG. 7A shows an optical module being worked on in manufacture, wherein the lens 32 has been installed in the lens holding member 30.

Figure 7B:
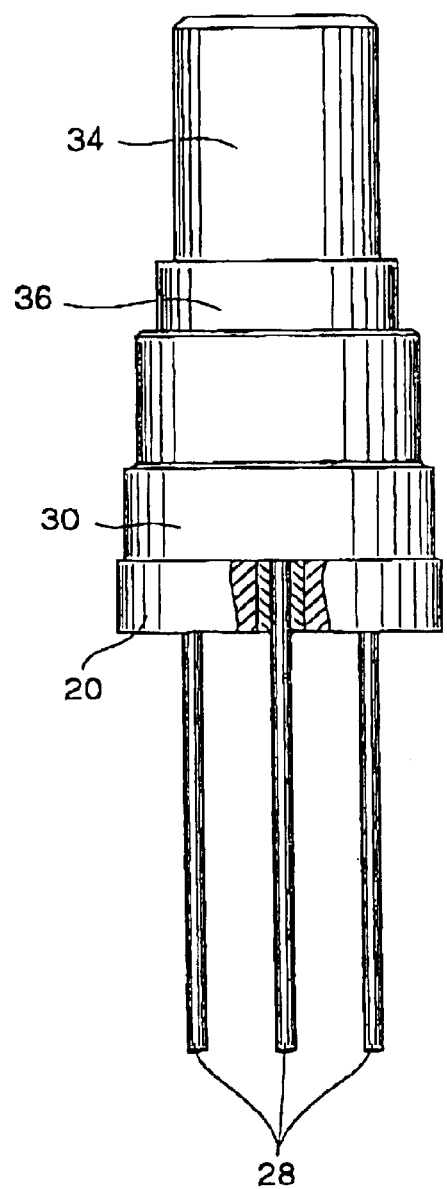
FIG. 7B is a view showing a completed optical module.

FIG. 7B shows an optical module being worked on in manufacture, wherein the sleeve holder 36 and sleeve 34 have been installed in the lens holding member 30. Then, the optical module 10 is completed. The optical module 10 exhibits excellent sealing characteristics at the glass sealing portions between the terminal electrodes 28 and the mounting member 20, and prevents the occurrence of defective products having insufficient sealing characteristics at the glass sealing portions.

Figure 8A:
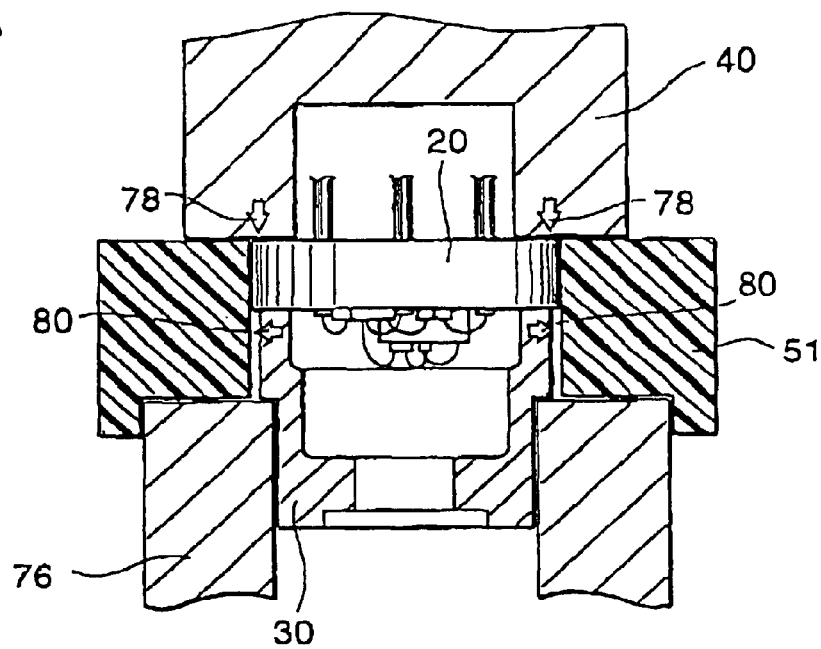
FIG. 8A illustrates the welding of a lens holding member of the embodiment to a mounting member by use of a comparative seam sealer apparatus.
Figure 8B:
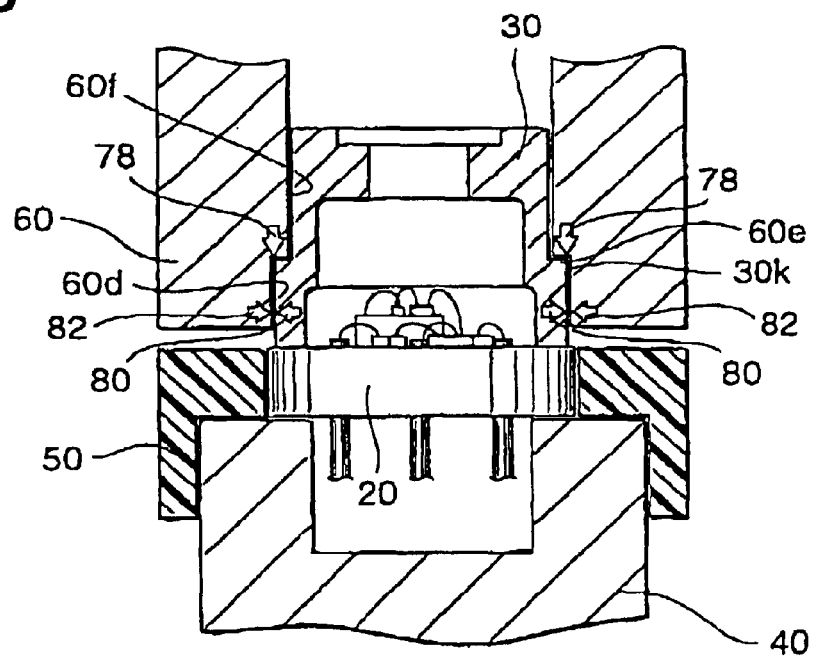
FIG. 8B illustrates the welding of a lens holding member of the embodiment to a mounting member by means of the seam sealer apparatus according to the embodiment.
Figure 9:
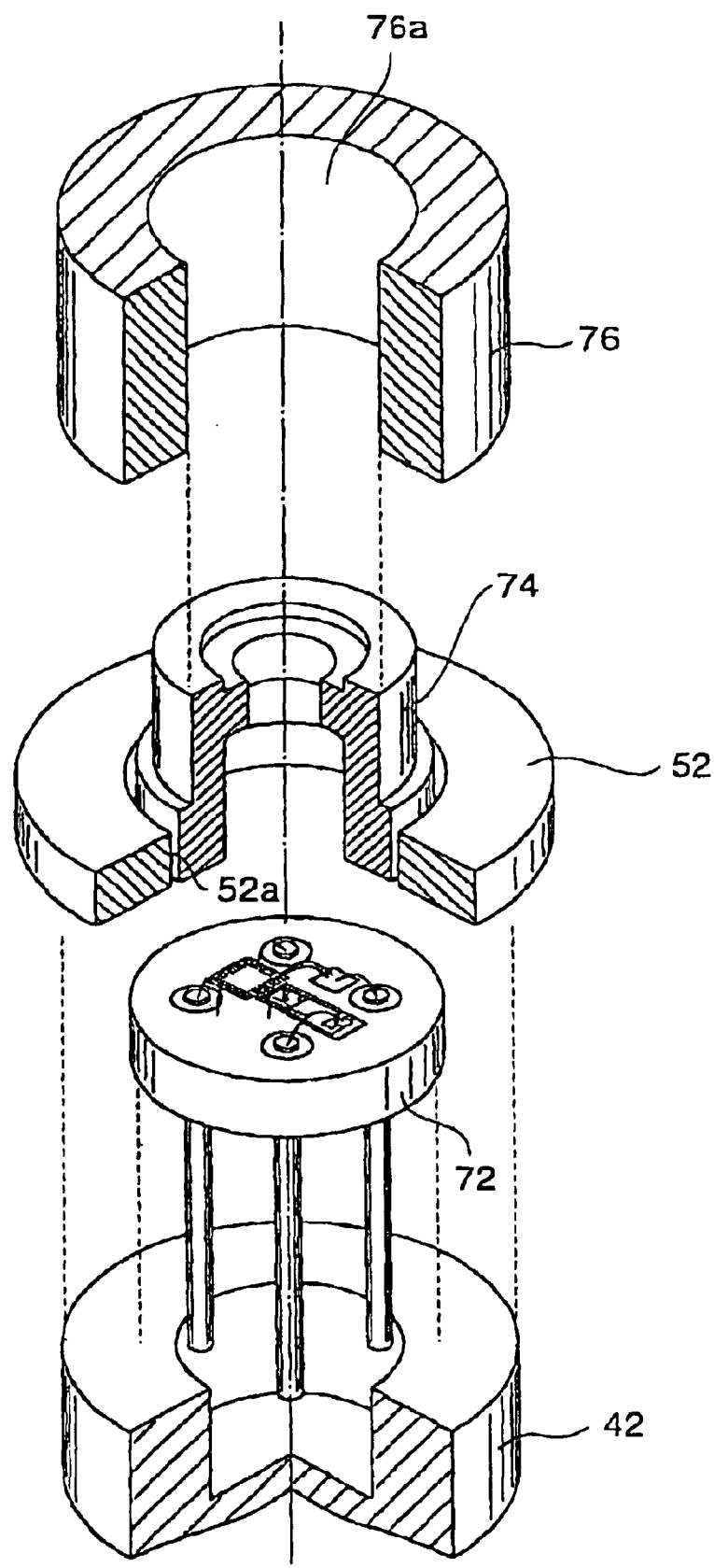
FIG. 9 is a view showing the welding of a lens holding member to a mounting member by ilse of a comparative seam sealer apparatus.
Figure 10A:
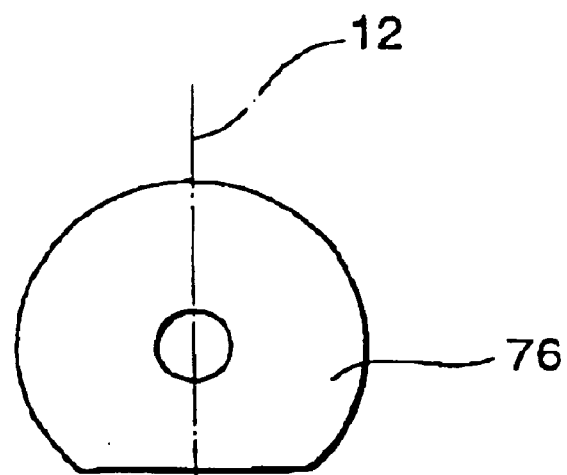
FIGS. 10A and 10B are views each showing an upper electrode of a comparative seam sealer apparatus.
Figure 10B:
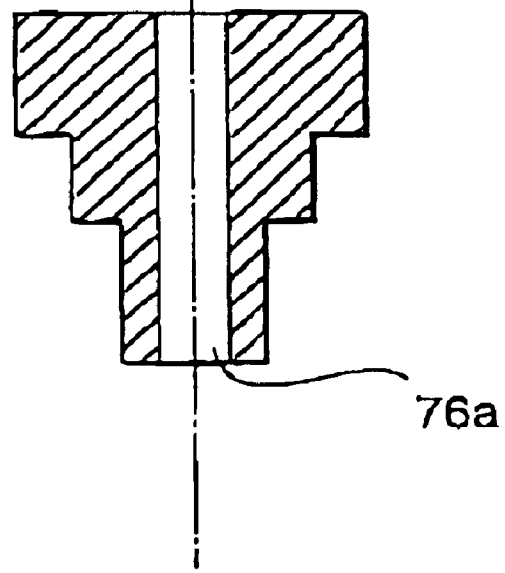

Referring to FIGS. 8A, 8B, 9, 10A and 10B, the reasons for an excellent hermetic sealing in the optical module 10 are now explained. FIG. 9 shows a seam sealer apparatus in which a comparative upper electrode is installed. FIGS. 10A and 10B illustrate this comparative upper electrode. As shown in FIGS. 9, 10A and 10B, a first electrode 76 comprises an accommodating hole 76a for accommodating a lens holding member 74. The accommodating hole 76a holds the lens holding member 76. A stem guide 52 is provided on the second electrode 42. A mounting component 72 is provided in an accommodating hole 52a of the stem guide 52.

FIG. 8A illustrates a manufacturing step of an optical module 10a 10 without using an upper electrode 60. The optical module 10 comprises a mounting member 20 and a lens holding member 30. The lens holding member 30 is provided on a seam sealing electrode 76. The mounting member 20 is provided on the lens holding member 30, while being guided by a stem guide 51 positioned in alignment with the electrode 76. An electrode 40 is provided on the stem guide 51 and the mounting member 20. Pressure 78 and welding current are applied between the electrode 40 and electrode 76. Pressure 80 coming from the pressure 78 acts on the side wall portion of the lens holding member 30, and hence deforms the side wall portion of the lens holding member 30. This deformation may damage the sealing characteristics of the glass sealing portion.

FIG. 8B shows a manufacturing step of an optical module 10 by use of an upper electrode 60. Even if the inner wall of the upper electrode 60 applied pressure 78 to the lens holding member 30, the inner wall 60d of the upper electrode 60 suppresses the deformation of the side wall 30k of the lens holding member 30. In other words, even if force 80 coming from the force 78 is applied so as to deform the side wall 30k, the inner face 60d of the upper electrode 60 applies the force 82 against the force 80 to reduce the deformation. This reduction prevents the occurrence of the insufficient sealing of the glass sealing portions.

(Third embodiment)

Figure 11:
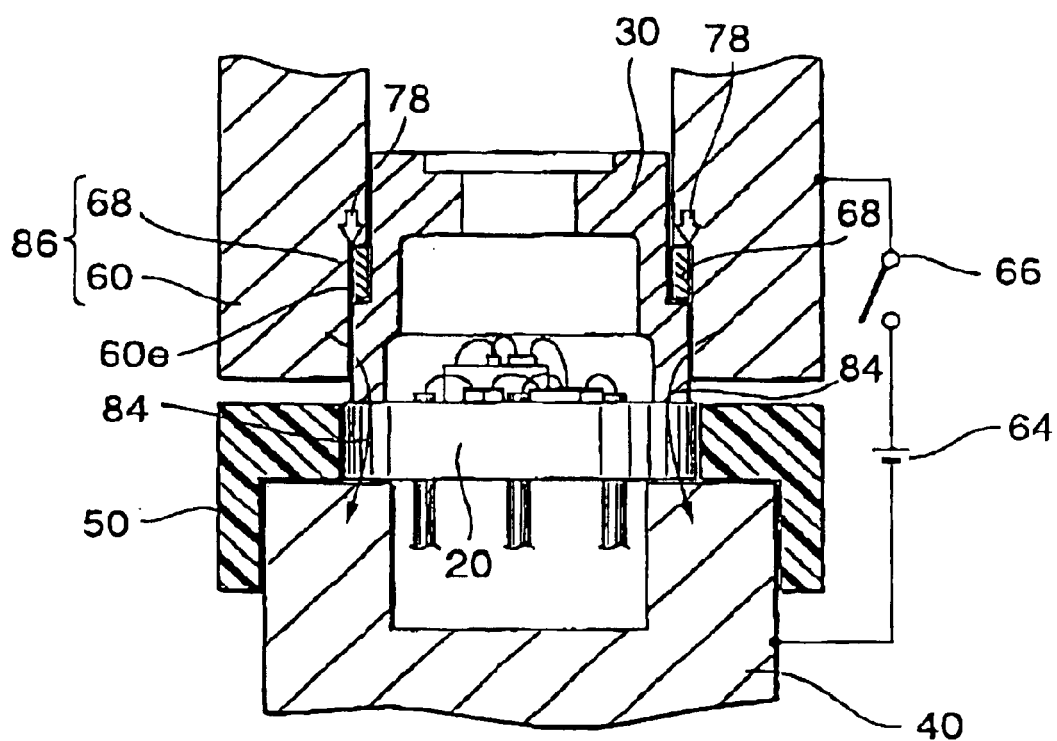
FIG. 11 is a view showing the welding of a lens holding member according to the embodiment to a mounting member by use of a seam sealer apparatus of another embodiment.

FIG. 11 shows another embodiment of an upper electrode. This upper electrode component 86 comprises an upper electrode 60 and an insulating component 68. The insulating component 68 is made from ceramic, for example, and is installed on the third inner face 60e. The insulating component 68 may be a loop-shaped member provided on the third inner face 60e, but is not limited thereto. If the insulating member 68 is provided between the third inner face 60e and the lens holding member, the current flows mainly on a path indicated by arrow 84 shown in FIG. 11. Since the upper electrode 60 has a lower electrical resistance than the lens holding member 30, the current concentrates on the welding portion of the lens holding member 30. Therefore, heat generation is suppressed at the side face of the lens holding member, thereby preventing this side face from deforming. Consequently, the sealing characteristics of the glass sealing portions becomes further improved. A third outer face 30m receives a force via the third inner face 60e and the insulating member 68.

As described in detail in the foregoing embodiments, in the optical module 10, the lens holding member 30 is accommodated within a cylindrical region, centered on the axis 12, of diameter of 4.5 mm (L≦4.5 mm). Moreover, in the optical module 11a A the sleeve 34 is accommodated within a cylindrical region, centered on the axis 12, of diameter of 4 mm (L≦4 mm). Therefore, an optical module having a structure capable of reducing its physical size and lowering the leakage of the glass sealing portions is provided. A seam sealer electrode component used for manufacturing the optical module is also provided.

(Fourth embodiment)

Figure 12:
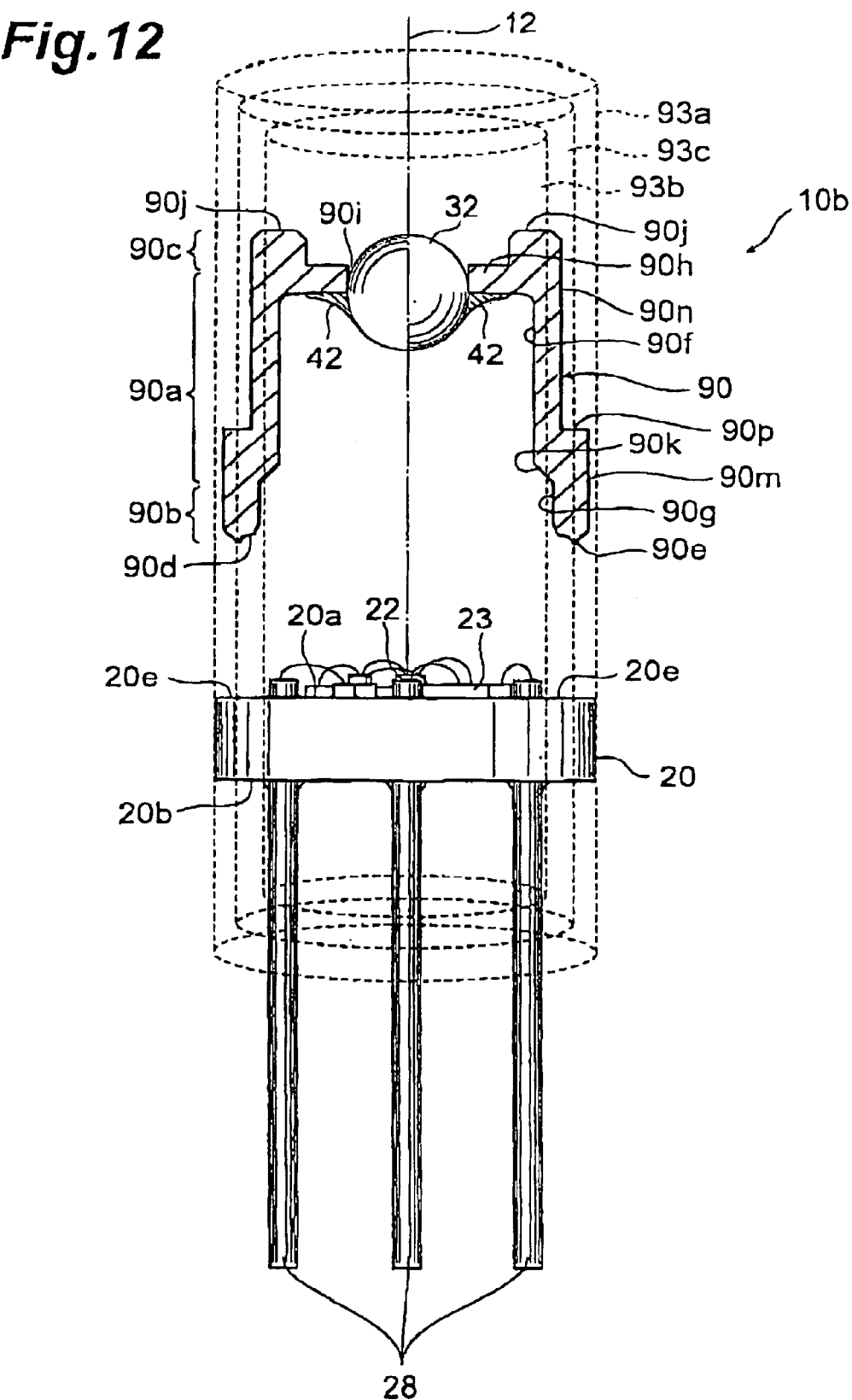
FIG. 12 is a view showing a positional relationship among a first inner face, a second inner face, and a reference surface in an optical module according to still another embodiment or the present invention.
Figure 13:
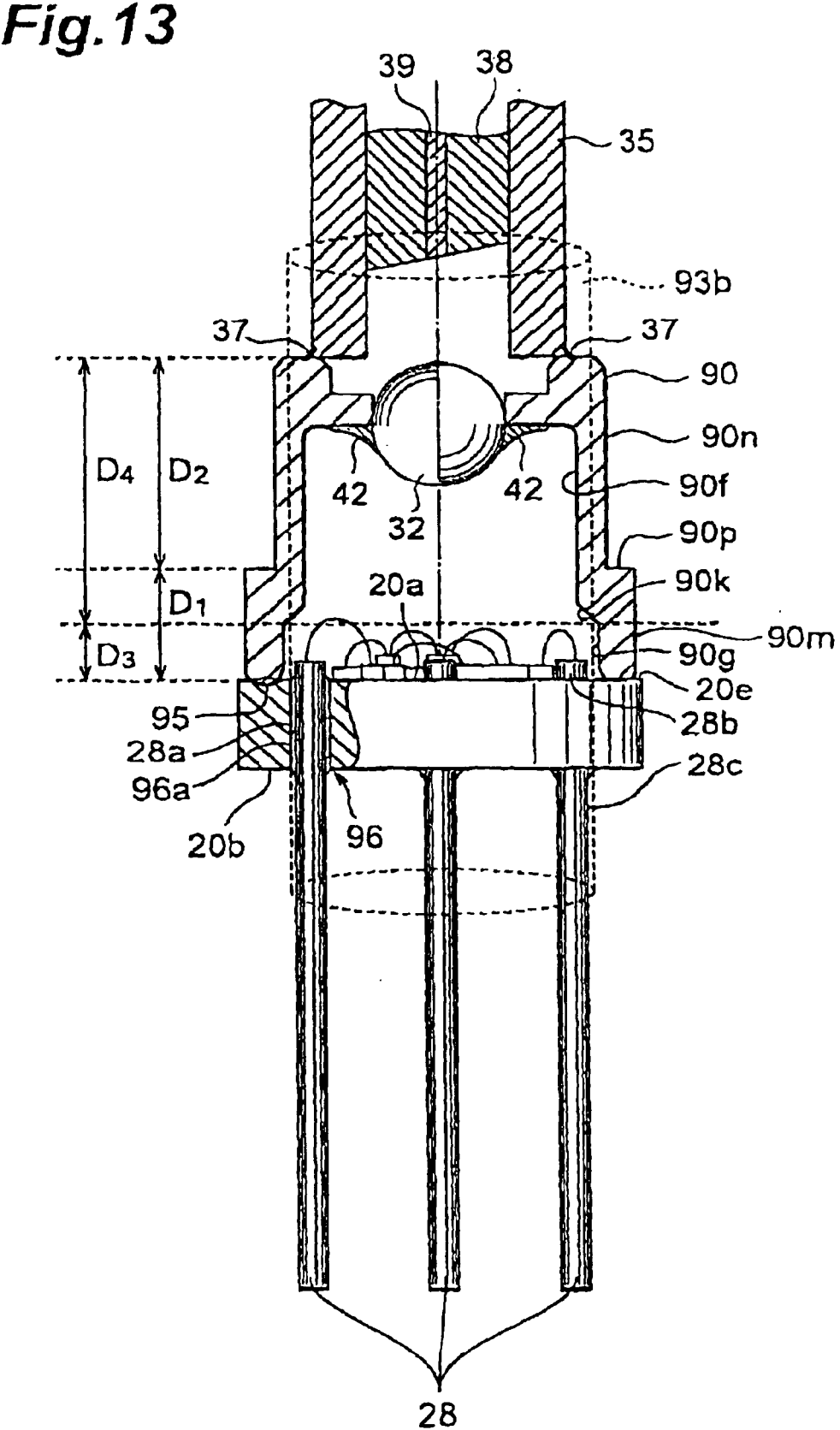
FIG. 13 is a cross sectional view showing an optical module according to still another embodiment of the present invention.

FIG. 12 illustrated the positional relationship of a mounting member and a lens holding member in an optical module according to still another embodiment. FIG. 13 is a cross sectional view of this optical module 10b.

Referring to FIG. 12, the lens holding member 90 of the optical module 10b comprises a tubular portion 90a, a first end portion 90b, and a second end portion 90c. The tubular portion 90a extends in a direction of the predetermined axis 12. The first end portion 90b is provided on one end of the tubular portion 90a. The second end portion 90c is provided on the other end of the tubular portion 90a. The lens holding member 90 is made of weldable metal. The first end portion 90b comprises a welding face 90d which contacts the mounting member 20. A continuous loop-shaped projection 90e is provided on the welding face 90d so as to surround the axis 12. The lens holding member 90 is provided on the mounting member 20 such that the welding face 90d is faced to the supporting face 20e of the mounting member 20.

The tubular portion 90a has a side wall extending in a direction of the predetermined axis 12, and this side wall comprises a first inner face 90g and a second inner face 90f. The first inner face 90g extends from the first end portion 90b. A loop-shaped extended portion 90h is provided on the second inner face 90f. The extended portion 90h forms a lens installation hole defined by a holding face 90i provided so as to surround the axis 12. The lens 32 is accommodated in the lens installation hole, and the lens 32 can be positioned by the lens installation hole. The lens 32 is secured to the lens holding member 90 through a bonding member 42 such that the secured lens 32 is faced to an optical semiconductor element 22. The bonding member 42 is provided in a ring shape and bonds the lens 32 and the holding face 90i to each other, thereby providing the good sealing characteristics at the bonding region. The second end portion 90c comprises a mounting face 90j for supporting a sleeve (reference numeral 35 in FIG. 13).

In the optical module 10b, it is possible to provide a lens holding member 90 on the supporting portion 20e, and to provide a sleeve holder (reference numeral 36 in FIG. 1) on the mounting face 90j of the lens holding member 90. According to this structure, a sleeve outside the lens holding member 90 is not needed, thereby reducing the size of the optical module 10b. The lens holding member 90 is positioned inside another a reference surface 93a, extending in a direction of the predetermined axis 12, provided so as to contact the outer edge of the mounting member 20. According to this structure, if the optical module is a light-emitting module, then it is possible to provide an optical module with a structure capable of reducing its physical size and achieving optical coupling between a semiconductor light-emitting element and an optical fiber without additional sleeve provided outside the lens holding member 90.

When the lens holding member 90 is secured onto the mounting member 20, a region for accommodating the optical semiconductor element 22 is defined by the component mounting face 20a, the inner faces 90f and 90g, the extended portion 90h and the lens 32. In the lens holding member 90, the mounting member 20 and the lens holding member 90 serve as a housing or accommodating member. The welded loop-shaped projection 90e and the bonding member 42 provide an optical module with the sealing of the accommodation region, and provide an optical module with a structure capable of reducing its physical size because an optical module does not rise a TO-type CAN case.

Referring to FIG. 13, the mounting member 20 comprises a plurality of holes 96. Terminal electrodes 28 pass through these holes 96, respectively. Each hole 96 has a side face 96a, and a glass member 28a is provided between the side face 96a of each hole 96 and the side face of each terminal 28. A sleeve 35 is mounted directly on the mounting face 90j, and a lens holding member 90 is secured by means of connecting portions 37, such as weld portions. The sleeve 35 may have the same structure as the sleeve 34, but it is not limited thereto. FIGS. 12 and 13 depict a cylindrical reference surface 93b (hereinafter, also referred to as the reference surface 93b). The reference surface 93b extends in a direction of the predetermined axis 12 and is defined such that it circumscribes the side faces 96a of all holes 96. The lens holding member 90 comprises a first inner surface 90g and a second inner surface 90f. By providing the lens holding member 90 with two inner surfaces 90f and 90g, the first inner surface 90g is positioned outside the reference surface 93b, and the second inner surface 90f is positioned inside the reference surface 93b. This structure of the lens holding member 90 allows the reduction of force acting to the glass member 28a in affixing the lens holding member 90 to the mounting member 20, thereby providing a structure which allows the hermetic sealing in the region of the sealing glass member.

The lens holding member 90 further comprises first to third outer surfaces 90m, 90n and 90p. The first outer surface 90m extends from the end portion 90b in a direction of the predetermined axis. The second outer surface 90n extends from the other end portion 90c in a direction of the predetermined axis 12. The first outer surface 90m is positioned outside the reference surface 93c. The second outer surface 90n is positioned inside a reference surface. A reference surface 93c extends in a direction of the predetermined axis 12, passes through the loop-shaped projection 90e provided on the supporting face 20e, and surrounds the mounting portion of the mounting member 20. The third outer surface 90p is connected to the first and second outer surfaces 90m and 90n with each other.

The side wall portion of the lens holding member 90 comprises a third inner surface 90k which connects the first inner surface 90g and the second inner surface 90f with each other. The supporting face 20e and the third outer face 90p extend along respective reference planes. The lens holding member 90 receives pressure from a welding electrode (reference numeral 60 in FIG. 4) via the third outer surface 90p.

The third inner surface 90k extends in another reference plane which intersects with the reference planes. Due to this inclination, it is possible to provide a structure capable of increasing the thickness between the third inner surface 90k and the third outer surface 90p, in comparison to the thickness of other regions of the lens holding member 90. This structure increases the mechanical strength of the third outer surface 90p, and the third outer surface 90p is bumped against the face (reference numeral 60e in FIG. 4) of a welding electrode (reference numeral 60 in FIG. 4).

Referring to FIG. 13, in the optical module 20b, the first outer surface 90m extends from the end portion 90b by a first distance $D_1$ in a direction of the predetermined axis 12. The second outer surface 90n extends from the other end 90c by a second distance $D_2$ in a direction of the predetermined axis 12. Since the first distance $D_1$ is shorter than the second distance $D_2$ in the lens holding member 90, then it is possible to shorten the flow path of the welding current in welding the mounting member 20 to the lens holding member 90.

In the optical module 10b, the side wall is divided into first and second portions arranged along the predetermined axis 12. The first inner surface 90g is provided in the first portion. The second inner surface 90f is provided in the second portion. The second length $D_4$ is longer than the first length $D_3$ in the lens holding member 90 and the first inner face 90g is positioned outside the reference surface 93b, so that is possible to increase a distance between the terminals 28 and the lens holding member 90 and to ensure a region for accommodating the optical semiconductor element.

In the mounting member 20, the component mounting face 20a mounts an electronic component thereon, and the terminal installation face 20b is opposed to the component mounting face 20a. Each of the terminals 28 comprises an internal terminal portion 28b projecting from the component mounting face 20a and an external terminal portion 28c projecting from the terminal installation face 20b. These terminals 28 are located inside the cylindrical reference surface 93b, and this cylindrical reference surface 93b circumscribes all of the glass sealing members 28a provided on the side faces of the respective terminals 28. Since the position of the inner surface of the lens holding member 90 is determined with reference to the reference surface 93b, it is possible to obtain a sufficient interval between the inner surface and the bonding wires 29 connected to the terminals 28 and to obtain excellent sealing performance due to the glass members 28a.

In the optical module 10b, it is possible to position the second outer face 90m inside the first outer surface 90n by locating a second inner surface 90f inside the cylindrical reference surface 93b, thereby increasing the surface area of the third outer surface 90p.

In the optical module 10b, since a flange is not provided on the first end portion 90b of the lens holding member 90, it is possible to reduce the width of the lens holding member. In other words, the lens holding member 90 has a first outer surface 90m extending from the first end portion 90b by a length $D_1$ along the reference surface 93c, and a first inner surface 90g extends from the end portion 90b by a length $D_3$ along the reference surface 93c, and the length $D_1$ is longer than the length $D_3$.

Figure 14:
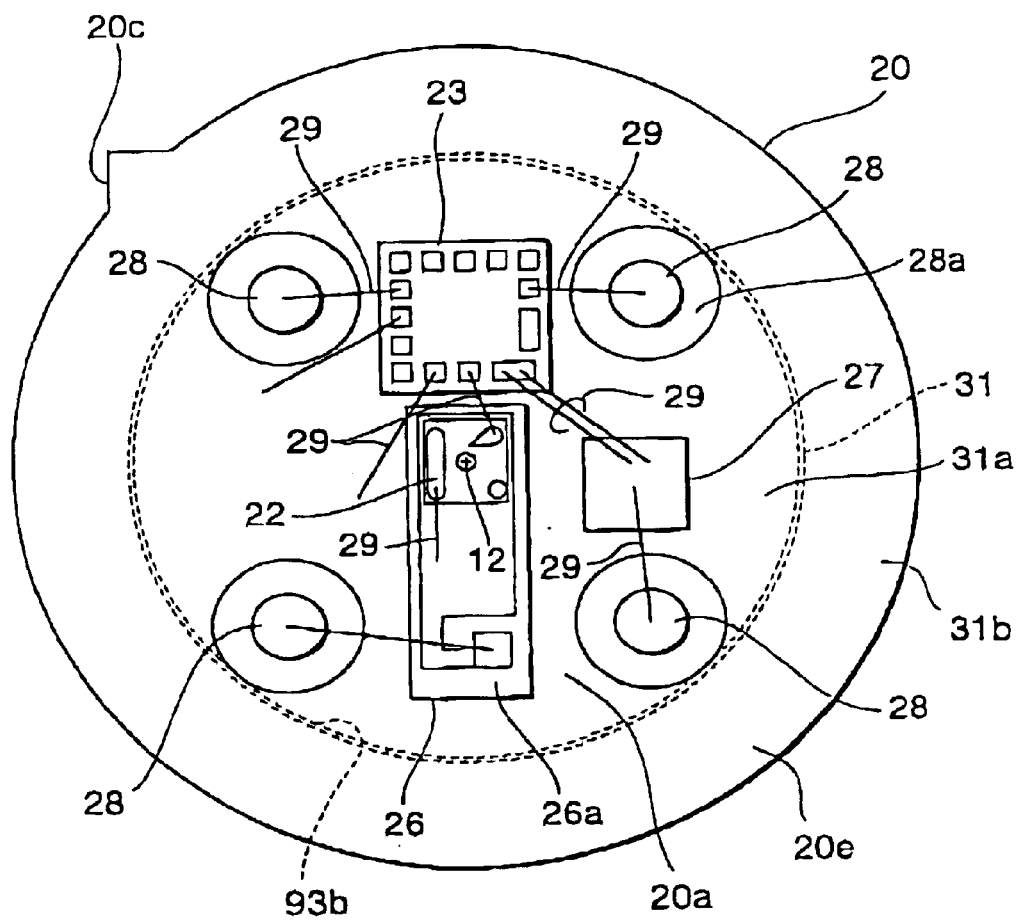
FIG. 14 is a view showing the component mounting face of a mounting member in an optical module according to still another further embodiment of the present invention.

FIG. 14 shows the component mounting face of the mounting member of the optical module. FIG. 14 shows a cylindrical reference surface 93b. In this optical module 10b, the second inner surface 90f of the lens holding member 90 circumscribes all four terminals 28. The component mounting face 20a is divided by a boundary line 31 into a mounting region 31a and a supporting region 31b.

Referring to FIG. 14, in the optical module 10b, a semiconductor element 23 is mounted in the mounting member 20. The semiconductor element 23 processes signals from an optical semiconductor element 22, such as a semiconductor light-receiving element. The terminals 28 of the mounting member are connected to the optical semiconductor element 22 and the semiconductor element 23 through connecting members, such as bonding wires 29. In the optical module 10b, since the first inner surface 90g is provided outside the cylindrical reference surface 93b, it is possible to provide a small-sized optical module 10b and to incorporate a plurality of electronic elements, such as the semiconductor element 23 and the semiconductor light-receiving element 22 in the optical module 10b.

Figure 15:
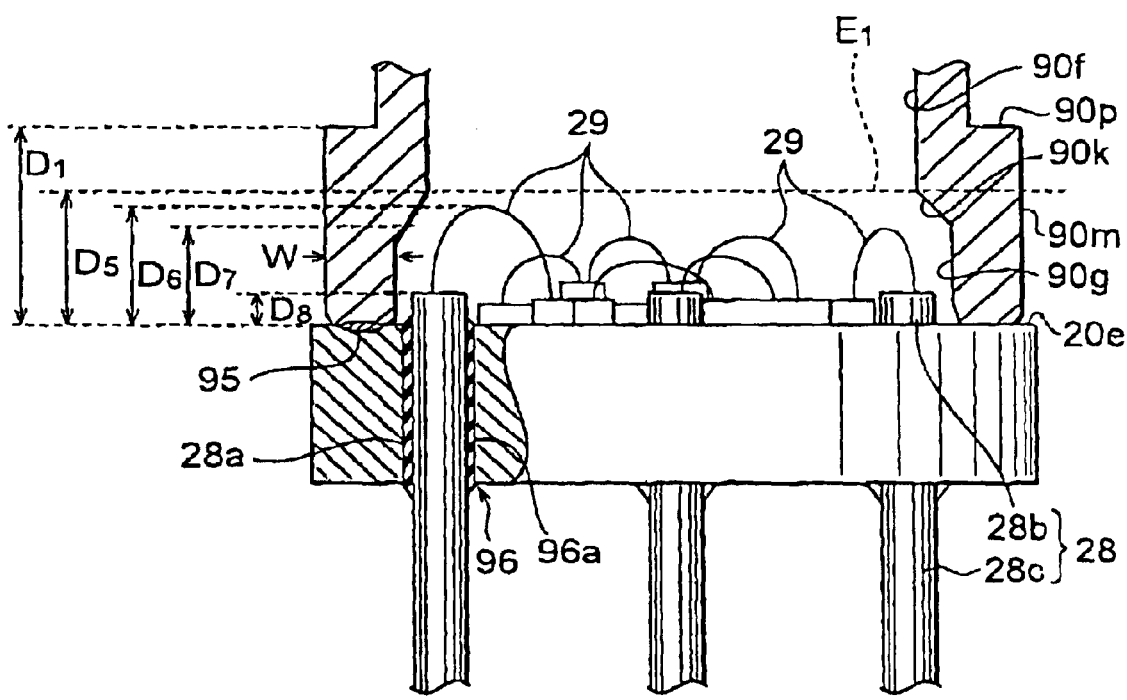
FIG. 15 is a cross sectional view showing a mounting member and a lens holding member according to still another embodiment of the present invention.

FIG. 15 is a cross sectional view showing a mounting member and a lens holding member of an optical nodule. The optical module 1b comprises bonding wires 29 for connecting terminals 28 to an optical semiconductor element 22.

The distance $D_5$ between the lower end $E_1$ of the second inner face 90f and the supporting face 20e is greater than the maximum value $D_6$ of the distance between the bonding wires 90 and the supporting face 20e. According to this configuration, it is possible to prevent the bonding wires 29 from contacting the inner surfaces 90f and 90g of the lens holding member 90 even if the terminals 28 and the optical semiconductor element 22 are connected by bonding wires 29 each having an individual shape.

It is preferable that the distance $D_1$ between the supporting face 20e and the upper end of the first outer surface 90m be not more than three times the distance W between the first inner surface 90g and the first outer wall 90m (i.e., the thickness of the side wall). Welding current flows in a portion between the first inner surface 90g and the first outer wall 90m. The experiment conducted by the present inventor reveals that it is possible to reduce the electrical resistance of this portion if the ratio $D_1/W$ is not more than 3 (the ratio $D_1/W \leq 3$), thereby achieving satisfactory welding.

Moreover, according to experiment by the present inventor, it is preferable that the distance $D_1$ between the upper end of the first outer surface 90m and the supporting face 20e be 1.0 mm or less and that the distance $D_1$ between the upper end of the first inner surface 90g and the supporting face 20e be greater than 05 mm. Each preferable condition provides good manufacturing tolerance with respect to the positional misalignment of the lens holding member, and provides sufficient intervals between the bonding wires and the inner surfaces. If the distance is 1.0 mm or less, then it is possible to obtain satisfactory welding portions. In this case, it is preferable that the side wall thickness be 0.4 mm or less.

In addition, according to experimentation by the present inventor, it is preferable that the length of the inner terminal portions 28b is in range from 0.2 mm to 0.4 mm. The mounting member 20 holds the terminals 28 via the glass sealing members 28a. If the length $D_8$ of the inner terminal portions 28b is 0.2 mm or less, then the sealing glass material of the mounting member may cover the portions of the terminals for connecting the bonding wires thereto. If the length of the terminals 28 is less than 0.4 mm, then it is possible to reduce the size of the lens holding member 90 and to achieve good welding portions between the lens holding member 90 and the mounting member 20. The value $D_5$–$D_8$ of 9.3 mm provides good manufacturing tolerances with respect to positional misalignment of the lens holding member, and provides satisfactory intervals between the bonding wires and the inner surfaces.

In the optical module 10b, the length of the first inner surface 90g is determined so as to provide an accommodating region sufficient to incorporate the optical semiconductor element 22 and to connect the optical semiconductor element 22 to the terminals 28 by the bonding wires 29. The length of the second inner surface 90f is determined such that the position of the lens 32 is provided so as to optically couple the optical semiconductor element 22 and the optical fiber (reference numeral 39 in FIG. 1) to each other. According to this structure, the lens holding member 90 is divided into two portions, and their respective dimensions can be determined to achieve their respective different functions.

(Fifth embodiment)

Figure 16A:
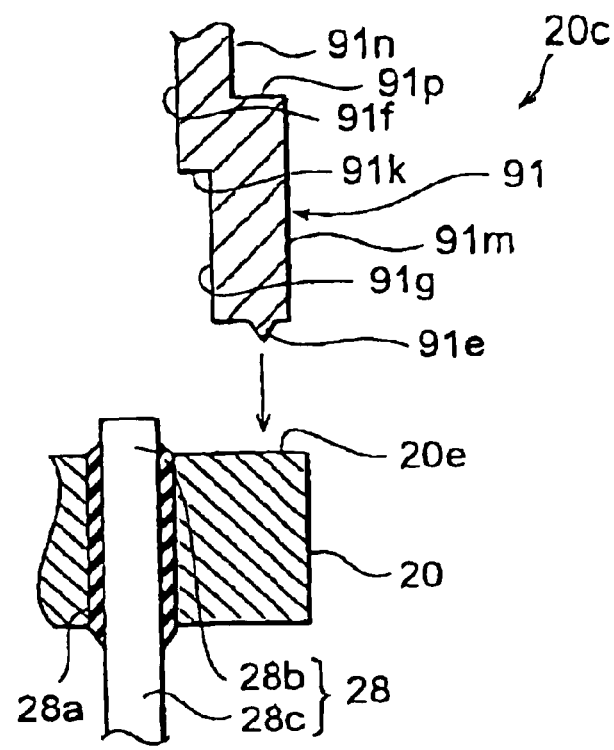
FIG. 16A is a view showing a lens holding member and a mounting member before welding.
Figure 16B:
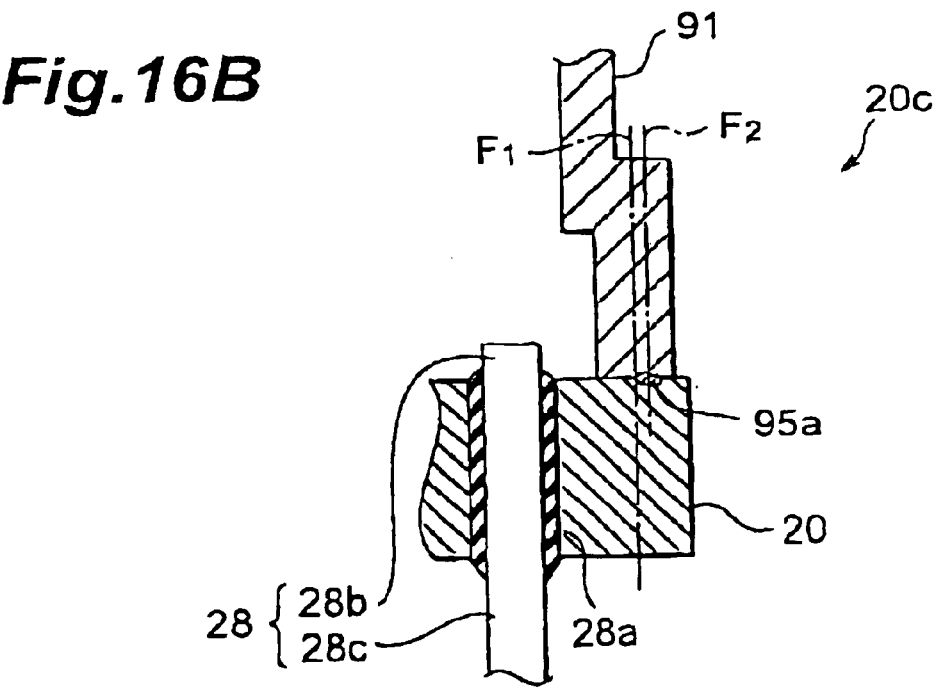
FIG. 16B is a view showing a lens holding member and a mounting member after welding.

FIG. 16A shows a lens holding member 92 and mounting member 20 before welding. FIG. 16B shows a lens holding member 91 and mounting member 20 after welding. The optical module 10c comprises the lens holding member 91 instead of the lens holding member 90 of the optical module 20b. A welding face 91d is provided on one end of the lens holding member 91. A loop-shaped welding projection 91e is provided on the welding face 91d. Similarly to the lens holding member 90, the lens holding member 91 comprises a first to third inner surface 91f, 91k, 91g and a first to third outer surface 91m, 91p, 91n.

The optical module 10c further comprises a welding portion 95a which bonds the one end of the lens holding member 91 with the supporting face 20e. The central line (single dotted line) $F_1$ between the first outer surface 91m and the first inner surface 91g is located inside the central line (single-dotted line) $F_2$ between the inner edge and outer edge of the welding portion 95a. According to this structure, it is possible to separate the terminals 28 of the mounting member 20 from the welding portion 95a It is also possible to reduce the occurrence of defects caused by a molten metal produced in welding the end portion of the lens holding member 91 and the supporting face 20e.

(Sixth embodiment)

Figure 17A:
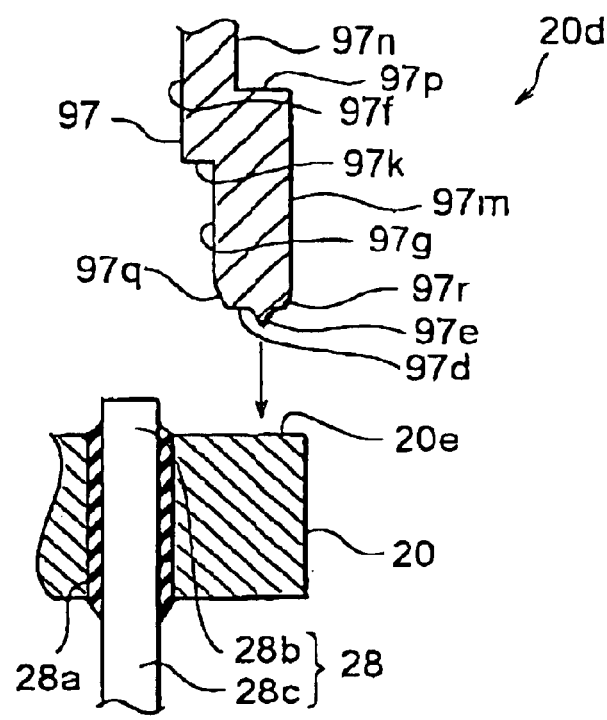
FIG. 17A is a view showing a lens holding member and a mounting member before welding.
Figure 17B:
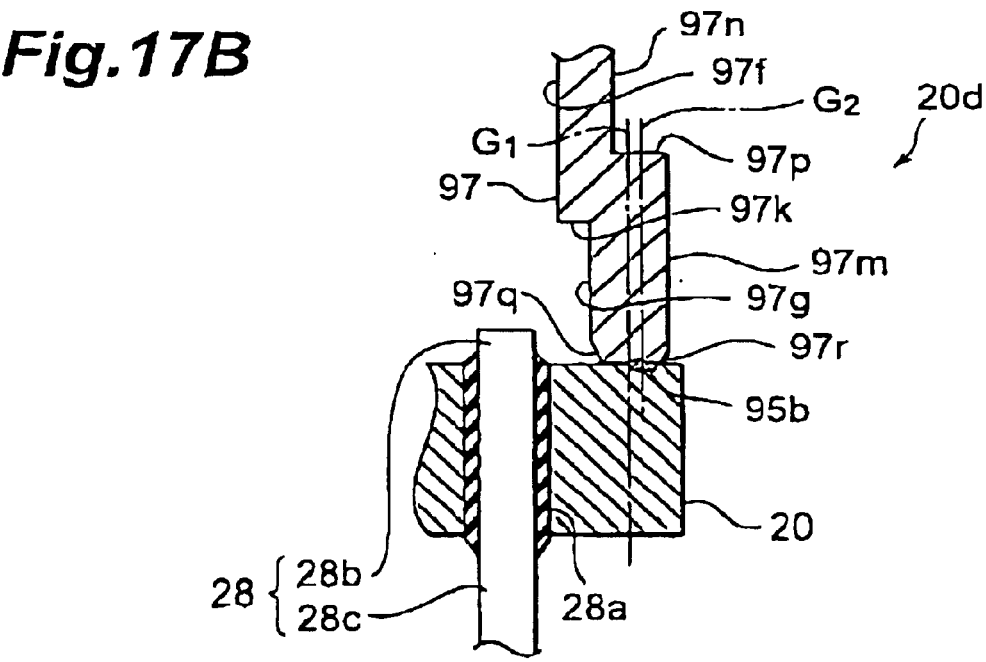
FIG. 17B is a view showing a lens holding member and a mounting member after welding.

FIG. 17A illustrates a lens holding member 97 and a mounting member 20 before welding. FIG. 17B illustrates a lens holding member 97 and a mounting member 20 after welding. The optical module 20d comprises a lens holding member 97 instead of the lens holding member 90 of the optical module 10d. A welding face 97d is provided on one end of the lens holding member 97. A loop-shaped welding projection 97e is provided on the welding face 97d. The lens holding member 97, similarly to the lens holding member 90, has a first to third inner surface 97f, 971k, 97g and a first to third outer surface 97m, 97p, 97n.

The optical module 10d is provided with a welding portion 95b for bonding the one end of the lens holding member 97 with the supporting face 20e. In the lens holding member 97, the first inner surface 97g has an inclined face 97q at the end portion. A welding portion 95b is located between the edge of the inclined face 97q and the edge of the first outer face 97m. According to this structure, the welding portion 95b can be separated from the terminals 28 of the mounting member 20 due to an inclined face 97q. When welding and applying pressure, molten metals enter a gap between the inclined face 97q and the supporting face 20e and solidify thereat. Therefore, it is possible to reduce the occurrence of defects due to the accumulations of molten metal as mentioned above.

The optical module 20d may comprise a welding portion 95b for bonding one end of the lens holding member 97 to the supporting surface. A first outer surface 97m of the lens holding member 97 comprises an inclined face 97r at one end thereof. The welding portion 95b is located between the edge of the inclined face 97r and the edge of the first inner surface 97g. According to this structure, when welding and applying pressure, molten metals are expelled and enter a gap between the inclined face 97r and the supporting face 20e. The molten metals are expelled towards the outside of the optical module 20d. Therefore, it is possible to reduce the occurrence of defects caused by the accumulations of molten metal as mentioned above.

In the respective embodiments described above, the central line (single-dotted line) G, between the first outer surface 97n and the first inner surface 97g is located inside the central line (single-dotted line) $G_2$ between the inner and outer edges of the welding portion 95b.

According to experiment by the present inventor, in the optical module illustrated in the fourth to sixth embodiments, good welding can be achieved not only by using the welding technique illustrated in FIG. 8B, but also by using the welding technique illustrated in FIG. 8A.

The principle of the present invention have been described above with reference to preferred embodiments, but it will be recognized by a person skilled in the art that the present invention can be modified and changed in arrangements and details without departing from the principle.

For example, the insulating member 60e may be constituted by a plurality of members provided on the third inner surface 60e, further modifications may be made as and when required.

Consequently, this patent claims the rights of all revisions and modifications originating from the claims of the patent and from the spirit of these claims.

What is claimed is:

1. An optical module, comprising:

an optical semiconductor element;

a mounting member having a mounting portion and a supporting face;

a lens optically coupled to said optical semiconductor element, said optical semiconductor element and said lens being arranged on a predetermined axis; and a lens holding member having an end portion, another end portion, a side wall portion and an extending portion, said lens holding member being welded to said supporting face of said mounting member at said end portion, said extending portion having a holding face extending in a direction of said predetermined axis for securing said lens, said lens holding member, said lens and said mounting member sealing said optical semiconductor element, said side wall portion including a first outer surface extending from said end portion to a direction of said predetermined axis and a second outer surface extending from said other end portion in a direction of said predetermined axis, said first outer surface being located outside an outer reference surface and said second outer surface being located inside said outer reference surface, said outer reference surface extending in a direction of said predetermined axis to surround said mounting portion, wherein said fist and second outer surfaces are provided such that an electrode of a seam sealer apparatus is enabled to hold said lens holding member.

2. The optical module according to claim 1, further comprising a welding portion having an inner edge and an outer edge for bonding said end portion of said lens holding member with said supporting face of said mounting member.

3. The optical module according to claim 2, wherein said lens holding member further includes a first inner surface, a center between said inner and said outer edges of said welding portion is positioned outside a center between said first inner surface and said first outer surface.

4. The optical module according to claim 2, wherein said first outer surface has an inclined face at said end portion of said lens holding member.

5. The optical module according to claim 1, wherein said lens holding member includes a third outer surface provided between said first outer surface and said second outer surface, said third outer surface receiving force applied in a direction of said predetermined axis via said electrode of said seam sealer apparatus.

6. The optical module according to claim 1, further comprising a sleeve mounted on said other end portion of said lens holding member, said sleeve receiving an optical connector therein for optically coupling said optical semiconductor element with said optical connector.

7. The optical module according to claim 1, wherein said lens holding member is contained within a cylinder with a diameter of 4.5 mm and centered on said predetermined axis.

8. The optical module according to claim 1, wherein said first outer surface has a first length and said second oute surface has a second length longer than said first length.

9. An optical module, comprising:

an optical semiconductor element;

a mounting member having a mounting portion, a supporting face and a terminal electrically connected to said optical semiconductor element with a bonding wire;

a lens optically coupled to said optical semiconductor element, said optical semiconductor element and said lens being arranged on a predetermined axis; and a lens holding member having an end portion, another end portion, a side wall portion and an extending portion, said lens holding member being welded to said supporting face of said mounting member at said end portion, said extending portion having a holding face extending in a direction of said predetermined axis for securing said lens, said lens holding member, said lens and said mounting member sealing said optical semiconductor element, said side wall portion including a first inner surface extending from said end portion to a direction of said predetermined axis and a second inner surface extending from said extending portion in a direction of said predetermined axis, wherein an interval between said second inner surface and said mounting member is greater than a maximum interval between said bonding wire and said mounting member.

10. The optical module according to claim 9, wherein a length of said first inner surface is greater than 0.5 mm.

11. The optical module according to claim 10, wherein said mounting member further provides a first face and a second face opposing said first face, said mounting portion being provided in said first face, and said terminal further includes an inner terminal portion projecting from said first face and an outer terminal portion projecting from said second face, and wherein a length of said inner terminal portion is in a range of 0.2 mm to 0.4 mm.

12. The optical module according to claim 9, further comprising a sleeve mounted on said other end portion of said lens holding member, said sleeve receiving an optical connector therein for optically coupling said optical semiconductor element with said optical connector.

13. The optical module according to claim 9, wherein said lens holding member is contained within a cylinder with a diameter of 4.5 mm and centered on said predetermined axis.

* * * * *